US008257169B2

(12) United States Patent
Englman

(10) Patent No.: US 8,257,169 B2
(45) Date of Patent: Sep. 4, 2012

(54) GAMING SYSTEM HAVING EXPECTED VALUE INDICATORS

(75) Inventor: Allon G. Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 347 days.

(21) Appl. No.: 12/530,180

(22) PCT Filed: Feb. 14, 2008

(86) PCT No.: PCT/US2008/001934
§ 371 (c)(1), (2), (4) Date: Sep. 4, 2009

(87) PCT Pub. No.: WO2008/108919
PCT Pub. Date: Sep. 12, 2008

(65) Prior Publication Data

US 2010/0105470 A1 Apr. 29, 2010

Related U.S. Application Data

(60) Provisional application No. 60/905,406, filed on Mar. 7, 2007.

(51) Int. Cl.
*A63F 9/24* (2006.01)
*A63F 13/00* (2006.01)

(52) U.S. Cl. .............................................. 463/25; 20/26

(58) Field of Classification Search .............. 463/16–20, 463/25–29, 31
See application file for complete search history.

(56) References Cited

U.S. PATENT DOCUMENTS

| | | | | |
|---|---|---|---|---|
| 6,146,273 | A * | 11/2000 | Olsen | 463/27 |
| 6,565,434 | B1 * | 5/2003 | Acres | 463/25 |
| 6,645,077 | B2 * | 11/2003 | Rowe | 463/42 |
| 6,966,834 | B1 * | 11/2005 | Johnson | 463/25 |
| 7,530,896 | B2 * | 5/2009 | Gauselmann | 463/27 |
| 7,674,180 | B2 * | 3/2010 | Graham et al. | 463/29 |
| 7,862,430 | B2 * | 1/2011 | Baerlocher et al. | 463/29 |
| 8,128,491 | B2 * | 3/2012 | Vasquez et al. | 463/27 |
| 2004/0072613 | A1 * | 4/2004 | Visocnik | 463/25 |
| 2005/0079911 | A1 * | 4/2005 | Nakatsu | 463/26 |

(Continued)

FOREIGN PATENT DOCUMENTS

WO WO 02/070089 9/2002

OTHER PUBLICATIONS

International Search Report in International Publication No. PCT/US08/001934, dated Jun. 27, 2008 (2 pages).

(Continued)

*Primary Examiner* — David L Lewis
*Assistant Examiner* — Shauna-Kay Hall
(74) *Attorney, Agent, or Firm* — Nixon Peabody LLP

(57) ABSTRACT

A gaming system comprises a wager input device for receiving at least one wager and at least one display for displaying a randomly selected outcome of a wagering game. The at least one display further displays an expected value indicator. The gaming system further comprises a controller operative to (i) add a portion of the at least one wager to an actual turnover, (ii) randomly select a trigger amount from a range of available trigger amounts, (iii) update the expected value indicator to indicate the actual turnover relative to the range, and (iv) award a mystery prize in response to the actual turnover becoming equal to or greater than the trigger amount.

20 Claims, 8 Drawing Sheets

U.S. PATENT DOCUMENTS

| | | | | |
|---|---|---|---|---|
| 2006/0073887 | A1 * | 4/2006 | Nguyen et al. | 463/27 |
| 2006/0166731 | A1 * | 7/2006 | Yoshimi et al. | 463/20 |
| 2006/0258424 | A1 * | 11/2006 | Green | 463/16 |
| 2007/0004505 | A1 | 1/2007 | Walker et al. | |
| 2007/0222150 | A1 * | 9/2007 | Wright et al. | 273/269 |
| 2008/0045288 | A1 * | 2/2008 | Moshal et al. | 463/16 |

OTHER PUBLICATIONS

Written Opinion Report in International Publication No. PCT/US08/001934, dated Sep. 7, 2009 (6 pages).

International Preliminary Report on Patentability in International Publication No. PCT/US08/001934, dated Sep. 8, 2009 (7 pages).

* cited by examiner

600

602 604 606 608 610 612 614 616

| MYSTERY LINK CALCULATION AND DATA | | | | | | | |
|---|---|---|---|---|---|---|---|
| PROGRESSIVE | PROB | TURNOVER | TOTAL EV | STRIKE | START UP | START UP EV | INCREMENT EV |
| LEVEL 1 | 0.69 | $2,898.55 | 1.50% | $43.48 | $20.00 | 0.69% | 0.81% |
| LEVEL 2 | 0.2 | $10,000.00 | 1.50% | $150.00 | $75.00 | 0.75% | 0.75% |
| LEVEL 3 | 0.1 | $20,000.00 | 1.00% | $200.00 | $150.00 | 0.75% | 0.25% |
| LEVEL 4 | 0.01 | $200,000.00 | 1.00% | $2,000.00 | $1,000.00 | 0.50% | 0.50% |

GAMING SYSTEM HAVING EXPECTED VALUE INDICATORS

CROSS REFERENCE TO RELATED APPLICATIONS

This application is a U.S. national stage filing of International Application No. PCT/US2008/001934, filed Feb. 14, 2008, which is related to and claims priority from U.S. Provisional Application No. 60/905,406, filed Mar. 7, 2007 which are both incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having one or more expected value indicators.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

One concept which has been employed in gaming systems is the awarding of mystery prizes or jackpots. Traditionally, such prizes are awarded to players independently of gameplay, in other words, not as a function of obtaining a particular outcome on a wagering game. Rather, mystery prizes are awarded through various triggering mechanisms. One such triggering mechanism is providing a mystery prize to one or more players at randomly selected time periods. Another triggering mechanism is awarding mystery prizes after a predetermined amount of wagers are received from players of the gaming system. Yet another triggering mechanism involves randomly selecting a predetermined jackpot trigger value and awarding the mystery award or jackpot when the jackpot value reaches the trigger amount. In this latter triggering mechanism, the gaming system may or may not display information as to the range of trigger values. One problem which exists is that even when such a range is displayed, players are unaware if and when the jackpot is more likely to be triggered given the current status of the jackpot within such range. Another problem that exists is that such mystery jackpots offer only a single, relatively larger prize, which often causes long periods of time in between successive triggering events of the jackpot. The present invention is directed to solving these and other problems.

SUMMARY OF THE INVENTION

According to one aspect of the present invention, a gaming system comprises a wager input device for receiving at least one wager and at least one display for displaying a randomly selected outcome of a wagering game. The at least one display further displays an expected value indicator. The gaming system further comprises a controller operative to (i) add a portion of the at least one wager to an actual turnover, (ii) randomly select a trigger amount from a range of available trigger amounts, (iii) update the expected value indicator to indicate the actual turnover relative to the range, and (iv) award a mystery prize in response to the actual turnover becoming equal to or greater than the trigger amount.

According to another aspect of the invention, a method of conducting a wagering game on a gaming system comprises receiving a wager, displaying a randomly selected outcome, and adding at least a portion of the wager to an actual turnover. The method further comprises randomly selecting a trigger amount from a range of available trigger amounts. The method includes displaying an expected value indicator indicating the actual turnover relative to the range, and awarding a mystery prize in response to the actual turnover becoming equal to or greater than the trigger amount.

According to yet another aspect of the invention, a method of conducting a wagering game on a gaming system comprises receiving a plurality of wagers and displaying a plurality of randomly selected outcomes of the wagering game. The method further comprises displaying a plurality of progressive jackpots, apportioning a portion of the plurality of wagers and adding the portion to an actual turnover, and distributing the portion among the plurality of progressive jackpots. The method further comprises randomly selecting a trigger amount from a range of available trigger amounts, and awarding a randomly selected one of the progressive jackpots in response to the actual turnover becoming equal to or greater than the trigger amount.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
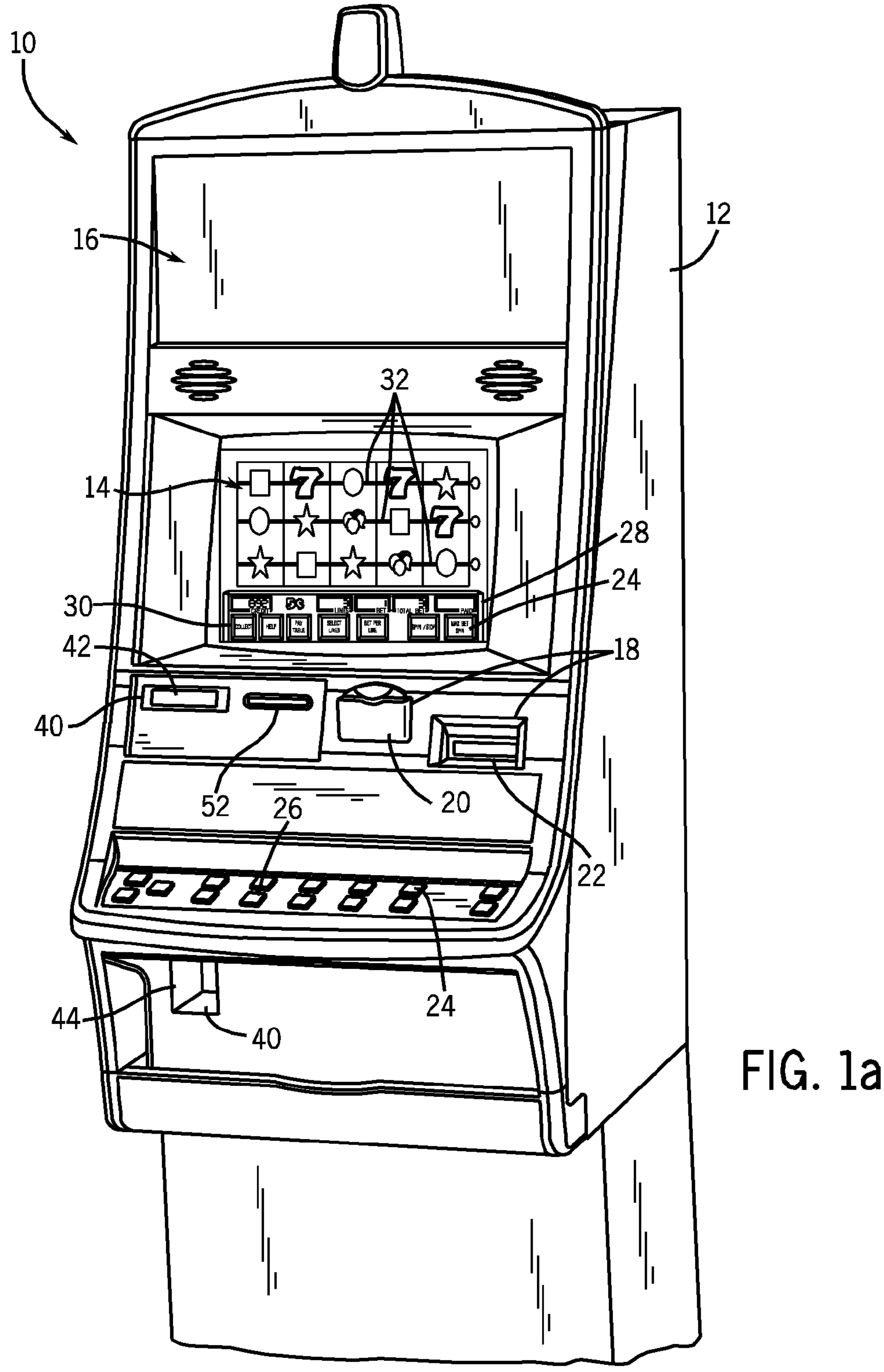
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
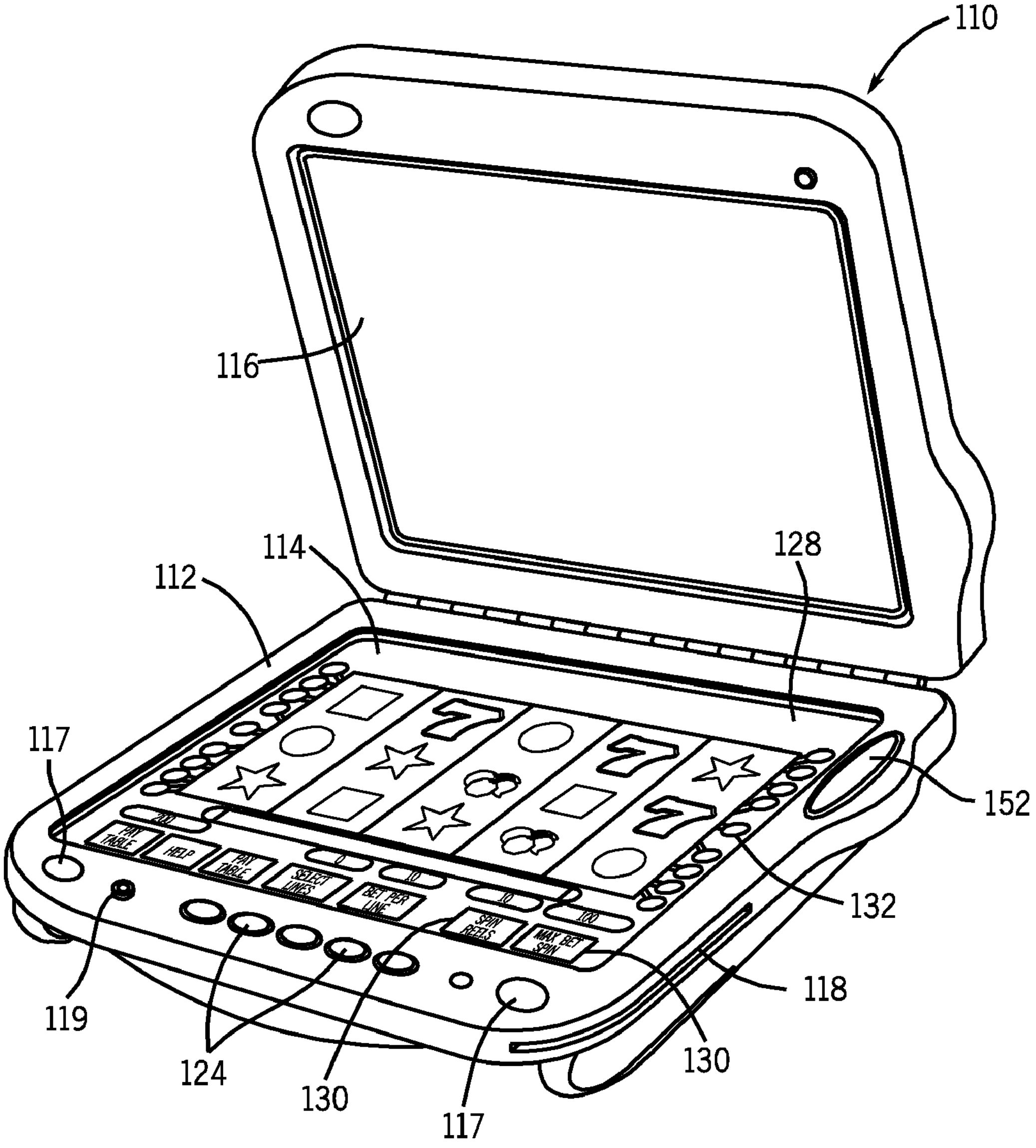
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
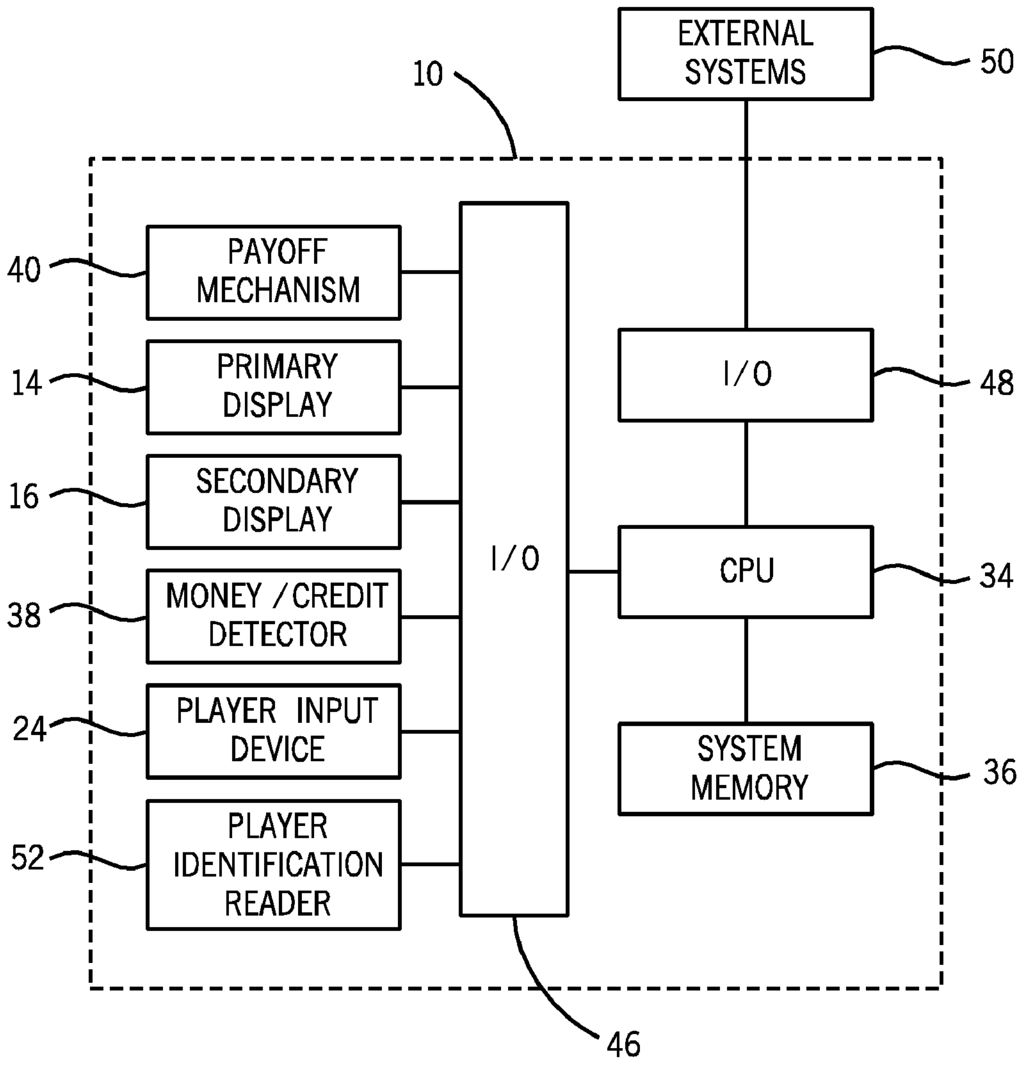
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
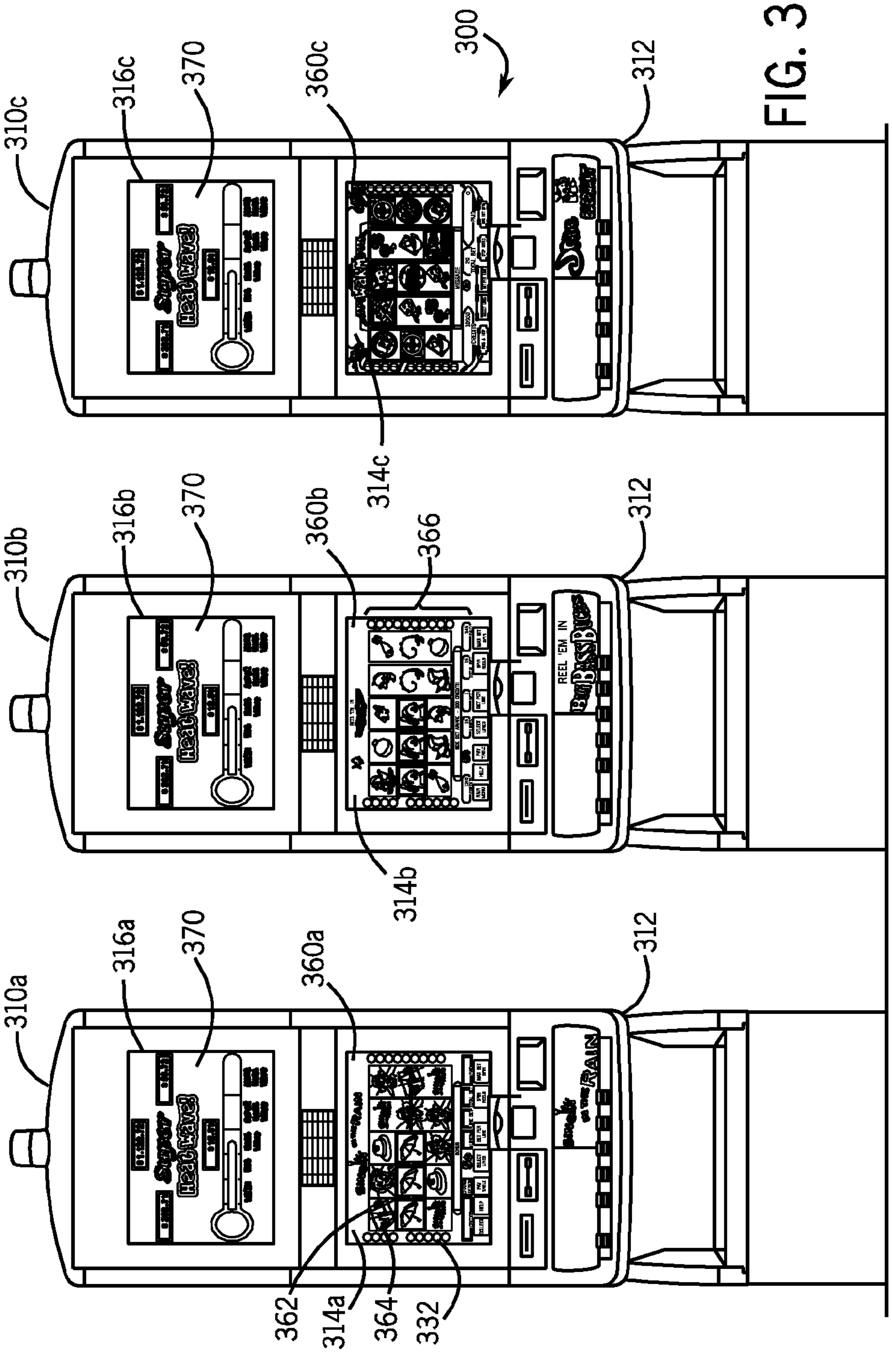
FIG. 3 is a front view of a gaming system of the present invention having one or more expected value indicators.

Turning now to FIG. 3, a gaming system 300 comprising a plurality of gaming machines 310*a,b,c*. Each gaming machine 310*a,b,c* includes a primary display 314*a,b,c* supported by the housing 312 of such gaming machine 310. The gaming machines 310*a,b,c* may be either free standing gaming machines (as shown in FIG. 3), handheld gaming machines (not shown) such as those in FIG. 1*b*, or any combination of the two. The primary displays 314*a,b,c* of each gaming machine 310*a,b,c* display wagering games 360*a,b,c*, which in this embodiment are slot games. The various displays 314*a,b,c* may display the same wagering game or each may display a different wagering game 360*a,b,c* as seen in FIG. 3. In this embodiment, the slot games 360*a,b,c* include a plurality of reels 362 which may be either electro-mechanical reels or simulations thereof on the primary displays 314*a,b,c*. The reels 362 include a plurality of symbols 364 displayed thereon which vary as the reels 362 are spun and stopped. The symbols 364 may include any variety of graphical symbols, elements, or representations, including symbols 364 which are associated with one or more themes of the gaming machines 310*a,b,c*. The symbols 364 may also include a blank symbol or empty space. As described herein the symbols 364 landing on the active paylines 332 (the paylines for which a wager has been received) are evaluated for winning combinations. If a winning combination of symbols 364 lands on an active payline 332, a primary award is awarded in accordance with a paytable of the gaming device. The symbols 364 on the reels 362 form a matrix 366 of symbols 364, having a number of rows and columns. In alternate embodiments, the matrices 366 may have greater or fewer symbols 364, and may take on a variety of different forms having greater or fewer rows and/or columns. The matrices 366 may even comprise other non-rectangular forms or arrangements of symbols 364.

The gaming system 300 may also include one or more secondary displays 316 for conveying and displaying jackpot information. In the embodiment shown in FIG. 3, each gaming machine 310*a,b,c,d* includes its own secondary display 316*a,b,c,d* supported by the housing 312 of the gaming machine 310*a,b,c,d*. However, instead of or in addition to such jackpot displays, the secondary display 316 may take on many other forms, including a community display or signage, or may even be incorporated as part of the primary display 314*a,b,c,d*. The secondary display 316 includes a jackpot-information display 370. In this embodiment, the jackpot-information display 370 comprises a mystery progressive jackpot game having a plurality of incrementing jackpot awards or meters. The jackpot information display 370 further includes at least one expected value indicator, which in this embodiment is a thermometer icon included on the secondary display 316. As used herein, a "mystery jackpot", "mystery prize," or "mystery award" refer to a jackpot, prize, or award that is provided or triggered independent of the outcome of a wagering game, and is instead triggered due to some other independent criteria. In this way, the jackpot, prize, or award may appear to players of the gaming system to have been triggered for no apparent reason, and thus the term "mystery" is used.

Figure 4:
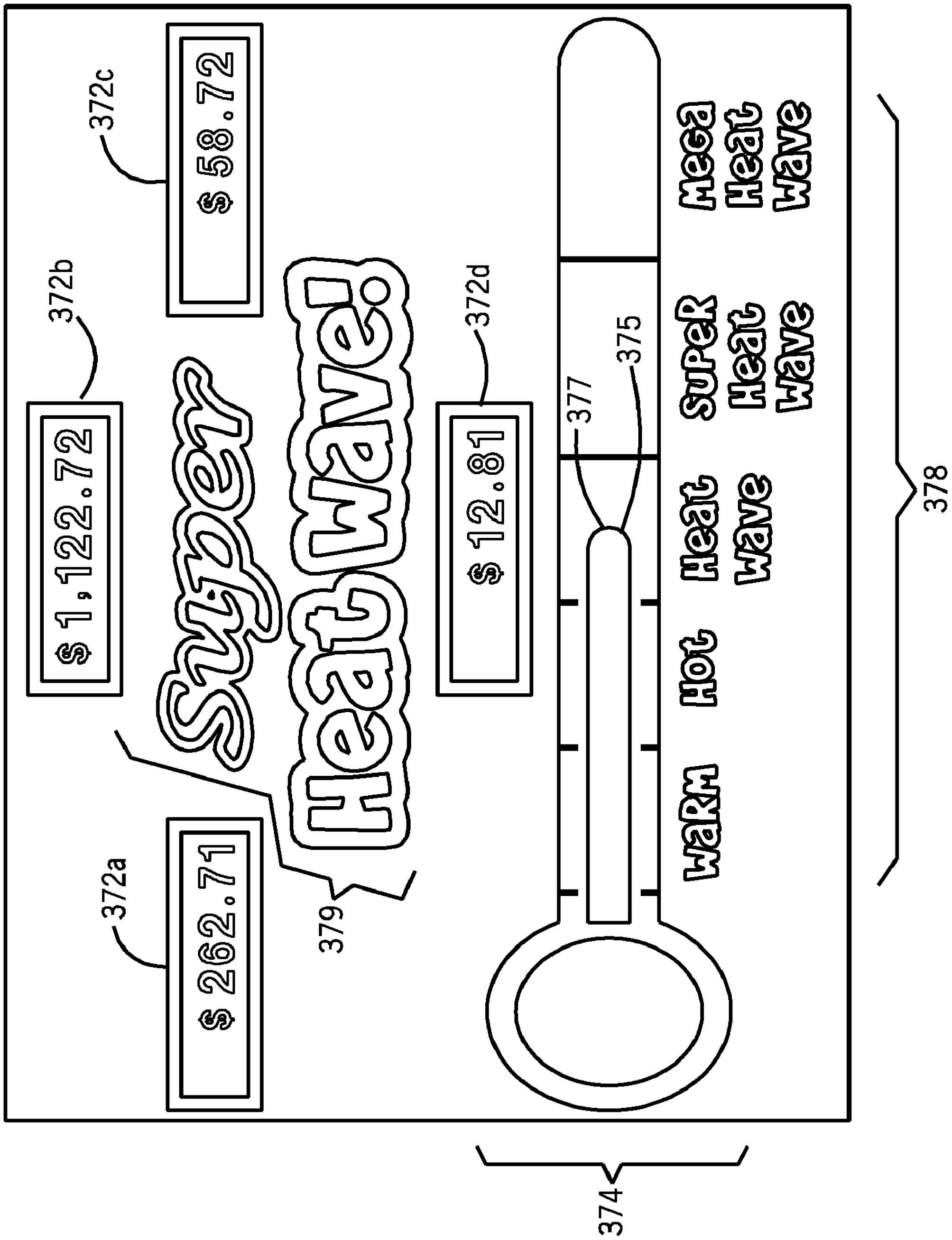
FIG. 4 is a front view of a secondary display of the gaming system of FIG. 3.

Turning to FIG. 4, a detailed view of the secondary display 316 of one of the gaming machines 310 is depicted. The jackpot information display 370 includes four incrementing mystery jackpot awards 372*a,b,c,d* or meters, shown positioned around a jackpot theme 379, which in this embodiment is entitled "SUPER HEAT WAVE™." Although in this embodiment the jackpot information display 370 comprises four mystery jackpot awards 372*a,b,c,d*, greater or fewer mystery awards 372 may be utilized in alternate embodiments. A percentage of wagers input into the gaming system 300 are utilized to fund and increment the jackpot awards 372, as is explained in detail herein. Along the bottom of the secondary display 316 is an expected value indicator 374, referred to herein as an "E.V. indicator." The E.V. indicator 374 includes a thermometer icon 376 or symbol, as well are a plurality of status labels 378.

The status labels 378 may include relevant alpha-numeric information which, in conjunction with the thermometer icon 376, conveys information relevant to an actual turnover 375 relative to an expected turnover value, as described in detail herein. In this embodiment, the status labels 378 include a plurality of "states" 380 (FIG. 5) of the current actual turnover 375 relative to the theoretical or expected turnover value. In various embodiments, the E.V. indicator 374 may include only graphics such as the thermometer icon 376, only labels 378, or both. A leading edge 377 of the mercury of the thermometer icon 376 communicates a position of, or relative value of the actual turnover 375, within a range. The actual turnover 375 corresponds to the accumulation of portions of wagers input into the gaming system 300 used to fund the mystery awards 372 since the immediately prior triggering of one of the mystery jackpot awards 372. In one embodiment, a portion of each wager input is added to the actual turnover, and the portion is also distributed amongst the various mystery awards 372. Thus, the actual turnover 375 tracks the total amount of the portions of wagers used to fund the mystery awards 372 since the last time the actual turnover was reset. In one embodiment, the actual turnover 375 is reset to zero after a mystery award 372 triggering event occurs. In other embodiments, other reset values may be used.

Figures 5, 6:
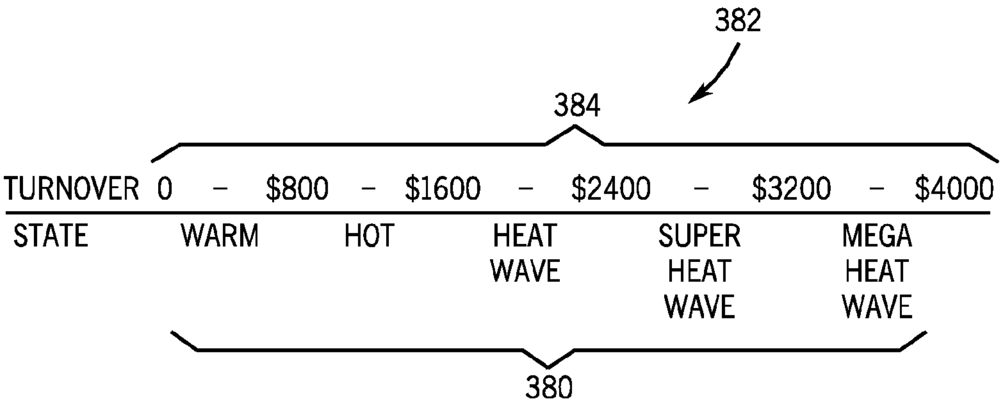
FIG. 5 is an expected-value table of a gaming system of the present invention.
FIG. 6 is a data table of the gaming system of FIG. 5.

In FIG. 5, an example expected-value table 382 of the gaming system 300 is shown. The expected-value table 382 includes a range 384 of turnover values across the top row of the table 382. In this embodiment, the range 384 is from $0 to $4,000. The expected-value table 382 further includes a plurality of "states" 380 of the jackpot. The "states" in this embodiment include "Warm," "Hot," "Heat Wave," "Super Heat Wave," and "Mega Heat Wave," which correspond to the state labels 378 of the E.V. indicator 374. Each state 380 is designed to correspond with a state of the jackpot so as to convey information about a current state of the jackpot relative to theoretical or expected values of the same. The states 380 provide a subjective status of the actual turnover 375 relative to the range 384 of turnover values. For example, when the actual turnover 375 is under $2,000 (the theoretical or expected value at which the mystery award 372 should be triggered), the state 380 is "Warm" or "Hot," subjectively indicating a lower theoretical chance that a triggering event is imminent.

However, when the actual turnover 375 exceeds the theoretical or expected value at which the mystery award 372 should be triggered ($2,000 in this case), then the state 380 indicates "Heat Wave," "Super Heat Wave," or "Mega Heat Wave" to subjectively communicate an increased probability of an imminent triggering event. In alternative embodiments, the E.V. indicator 374 may also include objective information such as the low end and high end values of the range 384, and the value of the actual turnover 375. However, in a preferred embodiment, only subjective information is conveyed by the E.V. indicator 374 so as to convey excitement and increase play of the gaming system 300, without revealing specific details of the exact values of the actual turnover 375 and the bounds of the range 384. As used herein, "turnover" refers to the accumulation of the portions of wagers input into the gaming system 300 that are dedicated to funding the mystery jackpot awards 372 that have not been triggered or awarded. Many other expected-value tables 382 may be utilized other than the one shown in FIG. 5 by way of example.

In the example shown in FIG. 5, an operator of the gaming system 300 has chosen to ensure that a mystery jackpot is triggered every $2,000 worth of turnover on average. Thus, the gaming system 300 is configured with the expected-value table 382 shown in FIG. 5. By having a range of turnovers from zero to $4,000, the average jackpot triggering turnover value will be $2,000, as the operator desires. Thus, the theoretical turnover trigger value is $2,000, but the actual jackpot triggering value is selected at random from the range of zero to $4,000. The "states" 380 correspond to the relative position of the actual value 375 of the jackpot turnover amount relative to the theoretical turnover trigger value. Thus, in operation, a controller of the gaming system 300 randomly selects a turnover trigger value between zero and $4,000, for example $3468.14. As players play the gaming system 300, portions of their wager inputs are used to fund and increment the turnover amount, which in turn are apportioned to the various mystery jackpot awards 372. The E.V. indicator 374 indicates the relative position of the actual turnover 375 amount relative to the selected trigger value. Thus, when the actual turnover 375 is between zero and $800, below the theoretical turnover trigger value of $2000, the corresponding state 380 of the jackpot is "Warm," according to the table 382. As the actual turnover 375 increases to be between $800 and $1600, the state 380 changes to "Hot." As the actual turnover 375 value further increases past the theoretical turnover trigger value ($2,000), the state 380 becomes "Heat Wave," indicating to the players that the jackpot triggering event is more likely to occur sooner rather than later. The other states 380 include "Super Heat Wave" and "Mega Heat Wave" that indicate ever increasing probabilities that the jackpot will be triggered.

In this embodiment, once the actual turnover 375 reaches the randomly selected turnover trigger value (e.g., $3,468.14), a jackpot triggering event has occurred. In some embodiments, the jackpot is triggered when the actual turnover 375 equals the randomly selected trigger value. In other embodiments, the actual turnover 375 must surpass, or be greater than, the selected trigger value for the jackpot to be triggered. In this embodiment, one of the four mystery jackpot awards 372 is randomly selected and awarded to the player whose wager contributed the incremental portion of turnover causing the jackpot triggering event. The mystery jackpot award 372 is randomly chosen in accordance with a weighted probability assigned to each of the four mystery jackpot awards 372. The weighted probabilities are stored in a data table (see FIG. 6) that is stored in memory accessible by a controller of the gaming system 300. After the mystery jackpot award 372 is selected and awarded to the player, that particular mystery jackpot 372 is reset, a new triggering turnover amount is randomly selected from within the turnover range 384, and the actual turnover again begins to accumulate towards a subsequent jackpot triggering event. The E.V. indicator 374 is also reset to indicate the relative position of the new turnover amount.

Turning to FIG. 6, an example jackpot data table 600 of the gaming system 300 is displayed. The information in the data table 600 is based upon the same example where the operator has selected the range of turnover values to be between zero and $4,000, with an average turnover value of $2,000. This average turnover value (the theoretical or expected value of the triggering turnover value, given the selected range) is also referred to as a "strike price." Thus, by selecting a turnover range of zero to $4,000, from which triggering amounts are randomly selected, the strike price is $2,000. In the first column 602 of the table 600, the various mystery awards 372 are listed, which in this embodiment are the four progressive mystery jackpots (see FIGS. 3-4), labeled level one through four. In the second column 604, the probabilities of triggering the particular mystery awards 372 are listed. Thus, when a jackpot triggering event occurs, one of the four mystery awards 372 is randomly selected in accordance with a weighted probability table, shown in the second column 604 of FIG. 6. Therefore, 69% of the time, the Level 1 award will be awarded, 20% of the time the Level 2 award will be awarded, 10% of the time the Level 3 award will be awarded, and 1% of the time the Level 4 award will be awarded. The third column 606 of the table 600 in FIG. 4, labeled "Turnover," represents the average turnover accumulated in between awards of each particular level of mystery award 372. Turnover is a function of the probability for each award 372 and the strike price, and is governed by the formula in Equation 1 below, showing an example calculation for the turnover of the Level 1 award:

$$\text{Turnover} = \frac{\text{Strike Price}}{\text{Probability}} = \frac{\$2{,}000}{0.69} = \$2{,}898.55 \qquad \text{Equation 1}$$

Thus, for the higher level awards (larger amounts) the turnover is larger between triggering of such awards given the relatively lower probability of triggering them. In the fourth column 608 of the table 600, the Total EV is shown. This represents a percentage of wagers input into the gaming system that the operator has selected to have apportioned to fund the mystery awards 372. Thus, in this embodiment, the operator has configured the gaming system such that 5% of wagers input into the system are used to fund the mystery awards 372, and that of that 5%, 1.5% is used to fund the Level 1 award, 1.5% is used to fund the Level 2 award, 1.0% is used to fund the Level 3 award, and 1.0% is used to fund the Level 4 award (totaling 5%).

In the sixth column 612 of the table 600 are shown the Start-Up values of the various levels of the awards 372, which are selected and customizable by the operator of the gaming system. The start-up values (or reset values) represent an amount of money that the various awards 372 reset to after being triggered or awarded. Thus, after a Level 1 award is won and distributed, the Level 1 jackpot resets to a Start-Up value of $20.00 as seen in the table 600. The other start-up values for the other awards 372 are also shown. The seventh and eighth columns 614,616 of the table 600 are the Start-Up EV and the Increment EV which represent the portions of the Total EV (fourth column 608) that fund the start up and incrementing, respectively, of each of the mystery awards 372. For example, looking at the Level 1 award, of the 1.50% Total EV for that award 372, a portion of it goes to funding the $20.00 start-up value when the Level 1 jackpot resets, and another portion of it goes to funding the incrementing of that jackpot. The Start-Up EV for each Level jackpot is a function of the operator's selected Start-Up value (column 612) and the Turnover (column 606). Specifically, the equation for the Start-Up EV is shown in Equation 2 below, showing an example calculation for the Start-Up EV for the Level 1 award:

$$\begin{aligned}\text{Start Up } EV &= \frac{\text{Start Up}}{\text{Turnover}} \\ &= \frac{\$20.00}{\$2{,}898.55} \\ &= 0.0069 \\ &= 0.69\%\end{aligned} \quad \text{Equation 2}$$

Thus, of the 1.50% Total EV for the Level 1 award, 0.69% contributes to the funding of the $20.00 Start-Up value. The remainder of the Total EV funds the incrementing of the Level 1 award. Thus, the following equations show the relationship between Total EV, Start-Up EV and Increment EV (Equation 3), showing an example calculation for the Increment EV for the Level 1 award (Equation 4):

$$\text{Total } EV = \text{Start Up } EV + \text{Increment } EV \quad \text{Equation 3}$$

Therefore:

$$\text{Increment } EV = \text{Total } EV - \text{Start Up } EV = 1.50\% - 0.69\% = 0.81\% \quad \text{Equation 4}$$

Thus, of the 1.50% Total EV for the Level 1 award, 0.81% contributes to the funding of the incrementing of the Level 1 award.

In the fifth column 610 of the table 600 is shown the Strike value for each of the various levels of awards 372. The Strike value represents the average value of the different levels of awards 372 when they are awarded. Of course on individual instances, the actual value of the award may be greater than, less than, or equal to the Strike value. But on average, the value of the awards will be the Strike values shown in the table 600. Thus, the average value, or strike value of the Level 1 award is $43.48. The strike values of the awards for Levels 2, 3, and 4, respectively, are $150.00, $200.00, and $2,000.00. The Strike value for a particular award 372 is a function of the Start Up value (column 612), the Turnover (column 606), and the IncrementEV (column 614). Specifically, the Strike value is governed by the Equation 5 below, showing an example calculation for the Strike value of the Level 1 award:

$$\text{Strike} = \text{StartUp} + (\text{Turnover})(\text{Increment } EV) = \$20.00 + (\$2{,}898.55)(0.0081) = \$43.48 \quad \text{Equation 5}$$

Therefore, the data table 600 shows the mathematics used for apportioning portions of received wagers and using the apportioned amounts to fund the various levels of jackpots. The table 600 also shows what the theoretical strike values of the jackpots are and the average turnover required for each jackpot to be triggered. The data in the table 600 is provided by way of example, but many other configurations of the data table 600 are possible. The operator customizable features (such as the Total EV and the Start-Up Values) affect many of the results shown in the table 600, and would be different for differing inputs selected by the operator. Many configurations are possible.

Figure 7:
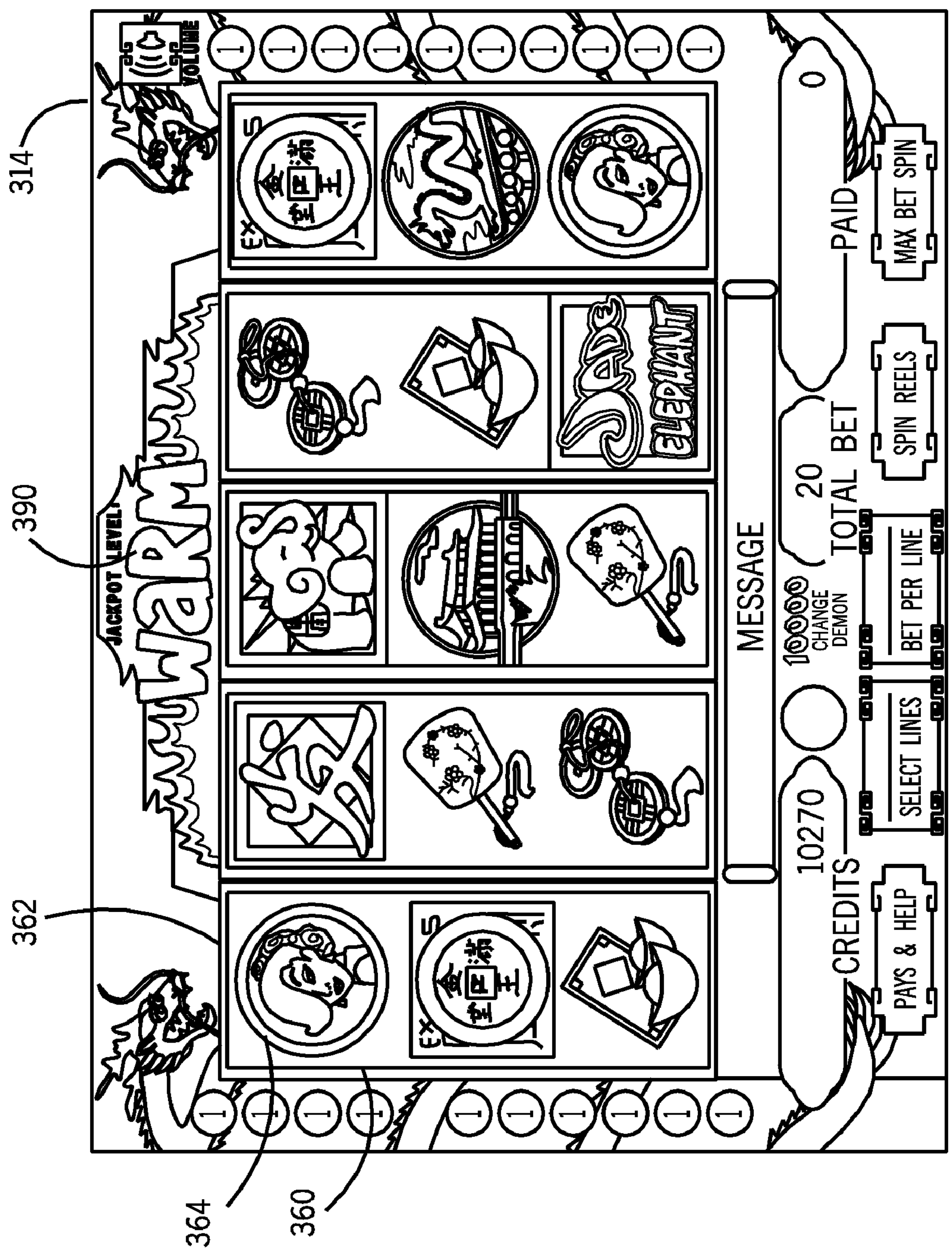
FIG. 7 is a front view of a primary display of the gaming system of FIG. 3.
Figure 8:
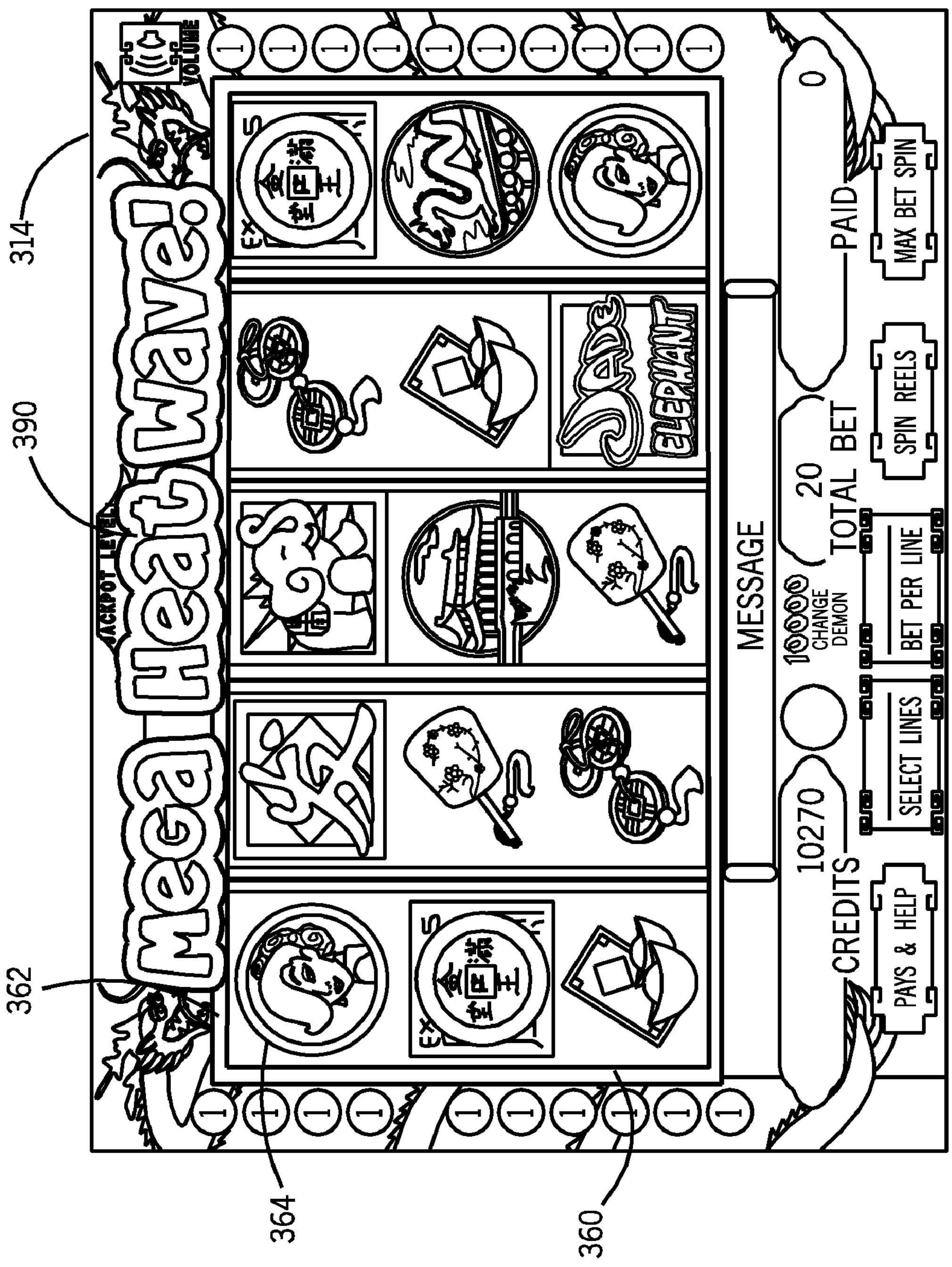
FIG. 8 is the primary display of FIG. 7 displaying a subsequent play of a wagering game.

In FIGS. 7 and 8, two screen shots displayed by the primary display 314 of one of the gaming machines 310 from FIG. 3 are shown. In FIG. 7, the primary display 314 depicts a slot game 360 having a plurality of symbol bearing reels 362. Each reel includes one or more symbols 364. At the top of the primary display 314, above the reels 362, is a secondary status label 390. In this instance, the secondary status label 390 communicates that the "Jackpot Level" is "Warm," corresponding to the "Warm" status label 378 and state 380 of the actual turnover 375 at that moment. In this way, a player who focuses his or her attention primarily on the play of the wagering game 360 on the primary display 314 is still aware of the state 380 of the jackpot without having to look at the E.V. indicator 374 on the secondary display 316. Similarly, in FIG. 8, at a different point of time during play of the wagering game 360, the secondary status label 390 has changed to indicate that the "Jackpot Level" is "Mega Heat Wave," corresponding to the "Mega Heat Wave" status label 378 and state 380 of the actual turnover 375 at that point in time. Also, the relatively more advantageous "Mega Heat Wave" state 380 is depicted in larger fonts and brighter colors on the secondary status label 390 (FIG. 8) than the less advantageous "Warm" state 380 shown in FIG. 7. Therefore, the shape, size, color, animation, sound, and other output capabilities of the gaming machine 310 may all be modified to provide differing presentations for the different states 380 shown in the secondary status label 390. In this way, the secondary status label 390 can be used to enhance player awareness and interest in the jackpot.

The gaming system of the present invention offers a number of benefits to players of the wagering game 360. Firstly, the E.V. indicator of the present invention permits players to be aware of the relative value of the actual turnover within a range of turnovers, so as to be able to assess whether there is a relatively increased or decreased likelihood of a jackpot being triggered. The E.V. indicator communicates to players if the actual turnover is above its theoretical average, thereby making it more likely that a jackpot triggering event will occur imminently. Moreover, the plurality of mystery awards or jackpots permits more frequent triggering of a mystery prize, as compared to single-prize progressives. The combination of using actual turnover as a triggering mechanism, coupled with the random selection of a progressive jackpot according to a weighted probability table, creates an enjoyable mystery prize for players and benefits operators of gaming systems by stimulating frequent and frenzied wagering.

Each of these embodiments and obvious variations thereof is contemplated as falling within the spirit and scope of the claimed invention, which is set forth in the following claims.

What is claimed is:

1. A gaming system comprising:

a wager input device for receiving at least one wager;

one or more displays for displaying a randomly selected outcome of a wagering game, the one or more displays further displaying an expected-value indicator; and a controller operative to:

(i) add a portion of the at least one wager to an actual turnover for a mystery prize;

(ii) randomly select an actual trigger amount for the mystery prize from a turnover range;

(iii) update the expected-value indicator to indicate the actual turnover for the mystery prize relative to a theoretical average trigger amount, but not the actual trigger amount, within the range, thereby indicating a theoretical probability that the mystery prize will be awarded; and (iv) award the mystery prize in response to the actual turnover for the mystery prize becoming equal to or greater than the actual trigger amount for the mystery prize.

2. The gaming system of claim 1, wherein the actual turnover funds a plurality of mystery jackpots, the mystery prize comprising a selected one of the mystery jackpots.

3. The gaming system of claim 2, wherein the plurality of mystery jackpots are progressive jackpots.

4. The gaming system of claim 2, wherein the selected one of the mystery jackpots is randomly selected.

5. The gaming system of claim 1, wherein the expected-value indicator includes a plurality of status labels.

6. The gaming system of claim 1, wherein the expected-value indicator is selected from a group of indicators consisting of a graphical indicator, a label indicator, and a graphical/label indicator.

7. The gaming system of claim 1, wherein the controller is further operative to reset the actual turnover to a reset value after the mystery prize is awarded.

8. The gaming system of claim 7, wherein the reset value is zero.

9. A method of conducting a wagering game on a gaming system, the method comprising:

receiving a wager;

displaying a randomly selected outcome;

adding at least a portion of the wager to an actual turnover for a mystery prize;

randomly selecting an actual trigger amount for the mystery prize from a turnover range;

displaying an expected-value indicator indicating the actual turnover for the mystery prize relative to a theoretical average trigger amount, but not the actual trigger amount, within the range, thereby indicating a theoretical probability that the mystery prize will be awarded; and awarding the mystery prize in response to the actual turnover for the mystery prize becoming equal to or greater than the actual trigger amount for the mystery prize.

10. The method of claim 9, wherein the expected-value indicator comprises a graphical presentation of the relative position of the actual turnover within the range.

11. The method of claim 10, wherein the expected-value indicator comprises a plurality of status labels.

12. The method of claim 9, wherein the mystery prize is randomly selected from a plurality of jackpots.

13. The method of claim 12, wherein the plurality of jackpots are progressive jackpots.

14. The method of claim 9, further comprising resetting the actual turnover to a reset value after awarding the mystery prize.

15. A computer readable storage medium encoded with instructions for directing a gaming system to perform the method of claim 9.

16. A method of conducting a wagering game on a gaming system, the method comprising:

receiving a plurality of wagers;

displaying a plurality of randomly selected outcomes of the wagering game;

displaying a plurality of progressive jackpots;

apportioning a portion of the plurality of wagers and adding the portion to an actual turnover for a mystery prize;

distributing the portion among the plurality of progressive jackpots;

randomly selecting an actual trigger amount from a turnover range;

updating an expected-value indicator to indicate the actual turnover for the mystery prize relative to a theoretical average trigger amount, but not the actual trigger amount, within the range, thereby indicating a theoretical probability that the mystery prize will be awarded; and awarding a randomly selected one of the progressive jackpots as the mystery prize in response to the actual turnover becoming equal to or greater than the trigger amount.

17. The method of claim 16, further comprising displaying an expected-value indicator indicating the actual turnover relative to the range.

18. The method of claim 17, wherein the expected-value indicator comprises at least one status label corresponding to a status of the actual turnover.

19. The method of claim 18, wherein the plurality of randomly selected outcomes are displayed on a primary display, wherein the plurality of progressive jackpots are displayed on a secondary display.

20. The method of claim 19, wherein the at least one status label is also displayed on the primary display.

* * * * *